United States Patent [19]

Fehlhaber

[11] Patent Number: 5,854,444

[45] Date of Patent: Dec. 29, 1998

[54] ENVIRONMENTALLY SEALED SPLICE KIT FOR SHIELDED CABLE AND METHOD THEREFOR

[75] Inventor: Gene L. Fehlhaber, Cave Creek, Ariz.

[73] Assignee: Phoenix Logistics, Inc., Phoenix, Ariz.

[21] Appl. No.: 906,767

[22] Filed: Aug. 5, 1997

[51] Int. Cl.$^6$ ................................................ H02G 15/188
[52] U.S. Cl. ............................ 174/84 R; 174/85; 439/98
[58] Field of Search .............................. 174/84 R, 84 C, 174/85; 439/98, 877, 882; 403/275, 278, 281

[56] References Cited

U.S. PATENT DOCUMENTS

| | | | |
|---|---|---|---|
| 3,404,216 | 10/1968 | Amann et al. | 174/84 R |
| 4,501,927 | 2/1985 | Sievert | 174/84 R X |
| 4,595,724 | 6/1986 | Koblitz | 174/84 R X |
| 4,764,232 | 8/1988 | Hunter | 174/84 R X |
| 5,281,763 | 1/1994 | Hey et al. | 174/84 R |

*Primary Examiner*—Bot L. Ledynh
*Assistant Examiner*—Chau N. Nguyen
*Attorney, Agent, or Firm*—Harry M. Weiss; Jeffrey D. Moy; Harry M. Weiss & Associates, P.C.

[57] ABSTRACT

An environmentally sealed splice kit for splicing together a shielded cable which is fully immersion protected and which is installed using only hand tool without using heat generating sources. The splice kit has a pair of crimp sleeves which are coupled to a separate wire braided end of the shielded cable. A jumper wire is coupled to each crimp sleeve for providing electrical continuity between each wire braided end of the shielded cable. A crimp ferrule is coupled to each wire braided end of the shielded cable for holding and connecting each crimp sleeve to each wire braided end of the shielded cable. Conductor splices are used for splicing together each center conductor of the shielded cable to be spliced together. A dielectric spacer is used for separating and providing an isolating medium between each center conductor to be spliced together and the jumper cable. A shield seal sleeve is placed around the shielded wire and positioned over the dielectric spacer for providing a sealing boot with shielding capabilities for the spliced shielded cable. A pair of end caps are coupled to each end of the shield seal sleeve and an adhesive sealant is placed inside each end cap for environmentally sealing the spliced shielded cable.

25 Claims, 1 Drawing Sheet

ENVIRONMENTALLY SEALED SPLICE KIT FOR SHIELDED CABLE AND METHOD THEREFOR

BACKGROUND OF THE INVENTION

1. Field of the Invention

This invention relates generally to connectors and, more specifically, to an environmentally sealed splice kit for splicing together a shielded cable which is fully immersion protected and which may be installed using only hand tool and no heat generating sources.

2. Description of the Prior Art

The current method of splicing together shielded cable calls for using crimp center conductors for splicing together the center conductors. A shield braid sleeving is used to provide a shielding effect for the splice. Solder sleeves are soldered to each braided end of the shielded cable to provided braid to braid connections for electrical continuity. Heat shrink tubing is placed around the spliced area for environmentally sealing the spliced shielded cable. When splicing together shielded cable using current kits and methods, the following tools are required: cable prep hand tools, crimp tools, and a heat gun for soldering sleeves and boot shrinking.

While present kits and methods do work for splicing together shielded cable, they have one main problem. Present kits and methods require a heat gun for melting the solder and shrinking the heat shrink tubing. The heat gun requirement makes present kits and methods unsafe for use in repairing damaged cable in a flight line environment. In order to repair damaged cables in an aircraft or vehicle, the aircraft or vehicle must be defueled. This is required so that the heat gun will not ignite the fuel and damage the aircraft or vehicle. Furthermore, present splice kits and methods are extremely time consuming to install (even longer if defueling is required), difficult to inspect, and prone to compromise the dielectric properties of the cable insulation if excess heat is applied or if adjacent wiring is not properly heat shielded.

Therefore, a need existed to provide an improved splice kit for shielded cable. The improved splice kit must environmentally seal the spliced shielded cable and be fully immersion protected. The improved splice kit must be able to be installed using only hand tool and no heat generating sources. The improved splice kit must further be able to splice together the damaged shielded cable in a shorter amount of time than present kits and methods. The improved splice kit must also prevent any stress from being applied to the spliced center conductors of the shielded cable.

SUMMARY OF THE INVENTION

In accordance with one embodiment of the present invention, it is an object of the present invention to provide an improved splice kit for shielded cable.

It is another object of the present invention to provide an improved splice kit that environmentally seals the spliced shielded cable and be fully immersion protected.

It is another object of the present invention to provide an improved splice kit that is able to be installed using only hand tool and no heat generating sources.

It is still another object of the present invention to provide an improved splice kit that is able to splice together the damaged shielded cable in a shorter amount of time than present kits and methods.

It is still another object of the present invention to provide an improved splice kit that prevents any stress from being applied to the spliced center conductors of the shielded cable.

BRIEF DESCRIPTION OF THE PREFERRED EMBODIMENTS

In accordance with one embodiment of the present invention, an environmentally sealed splice kit for splicing together a shielded cable which is fully immersion protected and which is installed using only hand tool without using heat generating sources is disclosed. The splice kit has a pair of crimp sleeves wherein each crimp sleeve is coupled to a separate wire braided end of the shielded cable. A jumper wire is coupled to each crimp sleeve for providing electrical continuity between each wire braided end of the shielded cable. The jumper wire is also used for providing axial strain relief for the shielded cable to be spliced together. A crimp ferrule is coupled to each wire braided end of the shielded cable for holding and connecting each crimp sleeve to each wire braided end of the shielded cable. Conductor splices are used for splicing together each center conductor of the shielded cable to be spliced together. A dielectric spacer is used for separating and providing an isolating medium between each center conductor to be spliced together and the jumper cable. A shield seal sleeve is placed around the shielded cable and positioned over the dielectric spacer for providing a sealing boot with shielding capabilities for the spliced shielded cable. A pair of end caps are coupled to each end of the shield seal sleeve and an adhesive sealant is placed inside each end cap for environmentally sealing the spliced shielded cable.

In accordance with another embodiment of the present invention, a method for splicing together and environmentally sealing a shielded cable which is fully immersion protected and which is installed using only hand tool without using heat generating sources is disclosed. The method comprises the steps of: trimming each end of the shielded cable to expose a wire shielded braid and center conductors to be spliced together; prepositioning on the shielded wire a splice kit such that a crimp ferrule is coupled to the wire shielded braid of each end of the shielded cable, end caps are placed on each end of the shielded cable for environmentally sealing the shielded cable, and a shield seal sleeve is positioned on one end of the shield cable in between the end cap and the crimp ferrules for environmentally sealing the center conductors to be spliced together; combing out the wire shielded braid on each end of the shielded cable; folding back the wire shielded braid that was combed out on each end of the shielded cable over the crimp ferrule; trimming insulation on each center conductors to be spliced together; coupling a crimp sleeve on each crimp ferrule wherein each crimp sleeve is coupled together by a jumper wire which is prewelded to each crimp sleeve, the prewelded jumper wire is used to provide electrical continuity between the wire shielded braid on each end of the shielded cable and for providing axial strain relief for the center conductors to be spliced together; coupling the center conductors to be spliced together using conductor splices; placing a dielectric spacer for separating and providing an isolating medium between the center conductors which are spliced together and the jumper cable; sliding the shield seal sleeve over the dielectric spacer to cover the conductor splices for providing a sealing boot with shielding capabilities for the spliced center conductors; placing an adhesive sealant inside each end cap for holding each end cap to the shield seal sleeve and environmentally sealing the shielded cable to be spliced together; and placing each end cap over an end of the shield seal sleeve.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
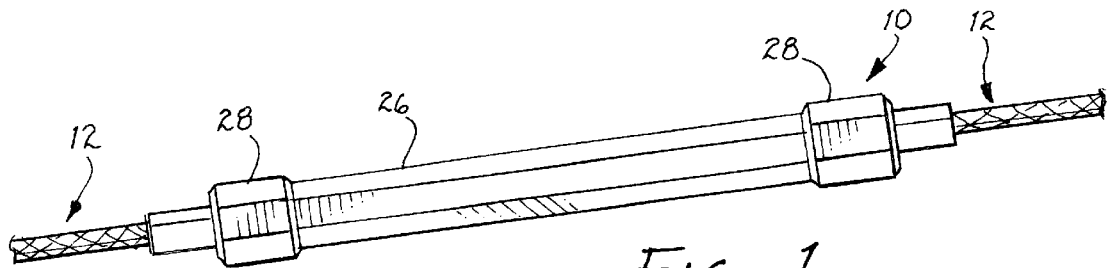
FIG. 1 shows an elevated perspective view of a splice kit for splicing together shielded cable using only hand tools of the present invention.
Figure 2:
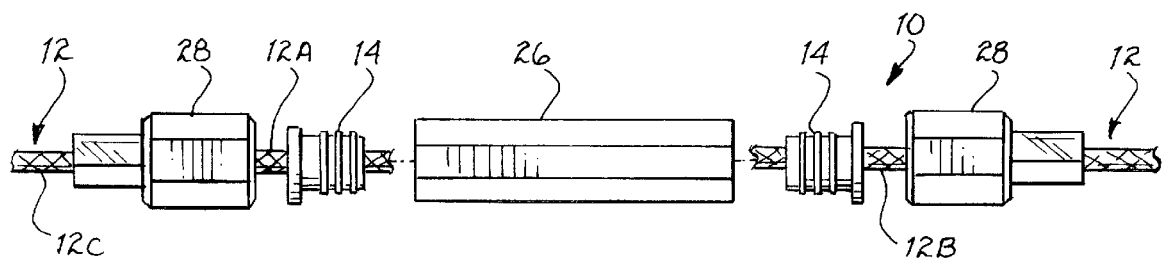
FIG. 2 shows an exploded view of a portion of the splice kit of FIG. 1.
Figure 3A:
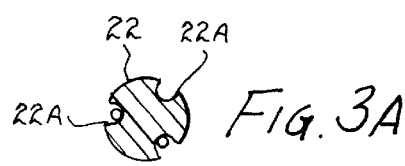
FIG. 3A shows a cross-sectional top view of the dielectric spacer depicted in FIG. 3 taken along lines 3A—3A
Figure 3:
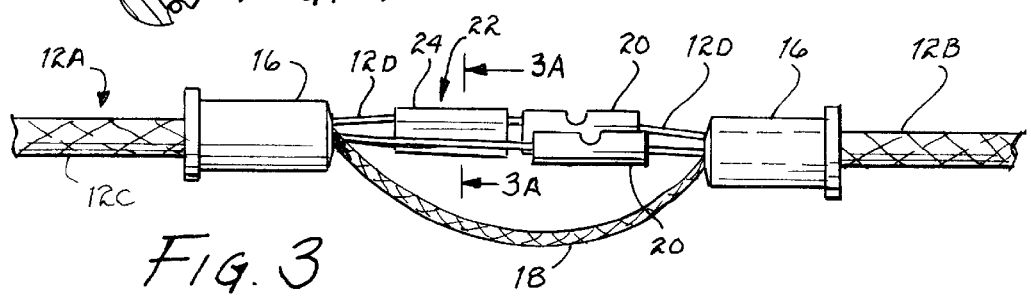
FIG. 3 shows the components inside the shield sleeve of the splice kit.

Referring to FIGS. 1–3, wherein like numerals and symbols represent like elements, a splice kit 10 is shown for splicing together a shielded cable 12. The splice kit 10 is fully immersion protected and may be installed using only hand tools and no heat generating sources. The splice kit 10 has a pair of crimp ferrules 14. The crimp ferrules 14 are placed on each end 12A and 12B of the shielded cable 12 which is to be spliced together. The shielded cable 12 has an outer braided wire covering which must be combed out of each end 12A and 12B and folded back over each crimp ferrule 14. This ensures braid to braid connections and electrical continuity for the shielded cable 12 which is to be spliced together.

A crimp sleeve 16 is coupled to each crimp ferrule 14. A jumper wire 18 is prewelded to each crimp sleeve 16. The jumper wire is used to provide electrical continuity between each wire braided end of the shielded cable 12. The jumper cable 18 is also used for providing axial strain relief for the center conductors 12D of the shielded cable 12 which are to be spliced together. Preferably, there is a quarter-inch differential between the length of the jumper cable 18 and the length of the center conductors 12D to be spliced together. This will allow the jumper cable 18 to be completely stretched out prior to any stress being applied to the center conductors 12D. When the crimp sleeves 16 are crimped in place, the jumper cable 18 will provide axial strain relief of greater than twenty (20) pounds. In the preferred embodiment of the present invention, the jumper cable 18 is a fixed length jumper of approximately 0.050" wide round metal braid.

Conductor splices 20 are used for splicing together each center conductor 12D to be spliced together. Conductor splices 20 are preferably of a crimp type so that heat generating tools are not required. Furthermore, crimp type conductor splices are preferred since solder type conductor splices are difficult to inspect and are prone to compromise dielectric properties of the cable insulation. In the preferred embodiment of the present invention, a MIL-S-81824 conductor splice is used.

A dielectric spacer 22 is used for separating and providing an isolating medium between each center conductor 12D which is spliced together and the jumper cable 18. As can be seen in FIG. 3A, in the preferred embodiment of the present invention, the dielectric spacer 22 has a plurality of slots 22A. The slots 22A are used for separating and holding each center conductor 12D (i.e., the center conductor 12D as well as the conductor splice 20) which is spliced together and the jumper cable 18. Preferably, the dielectric spacer 22 is made out of ULTEM Polyetherimide.

Referring back now to FIGS. 1–3, to ensure that each center conductor 12D and the jumper cable 18 do not come in contact with one another, nonconducting tape 24 is wrapped around the outer diameter of the dielectric spacer 22 once each center conductor 12D and the jumper cable 18 are positioned in the slots 22A of the dielectric spacer 22. The nonconducting tape 24 holds each center conductor 12D and the jumper cable 18 within each slot 22A of the dielectric spacer 22 thereby separating and providing an isolating medium between each center conductor 12D and the jumper cable 18. In the preferred embodiment of the present invention, the nonconducting tape 24 is KAPTON dielectric barrier tape.

A preformed shield seal sleeve 26 is placed around the spliced shielded wire 12 and positioned over the dielectric spacer 22. The shield seal sleeve 26 is used for providing a sealing boot with shielding capabilities for the center conductors 12D which were spliced together.

Figure 4:
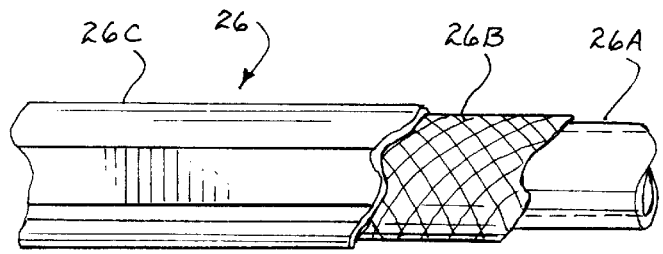
FIG. 4 is a cut away view of the shield sleeve of the splice kit.

As can be seen in FIG. 4, wherein like numerals and symbols represent like elements, the shield seal sleeve 26 is comprised of three different layers. The inner layer is a nonconductive inner sleeve 26A for providing dielectric protection for the shielded cable 12 which is spliced together. A braided wire sleeve 26B is placed over the nonconductive inner sleeve 26A. The braided wire sleeve 26B is used for providing a shielding effect for the shielded cable 12 which was spliced together. A sealing sleeve 26C is positioned over said braided wire sleeve for environmentally sealing the shielded cable 12 which was spliced together. Thus, the sealing sleeve protects the spliced shielded cable 12 from common aircraft fuels and solvents.

In the preferred embodiment of the present invention, the sealing sleeve 26C is smaller in length than the braided wire sleeve 26B. This allows each end of the braided wire sleeve 26B to be exposed. This will provide electrical continuity between each wire braided end of the shielded cable 12 to be spliced together. Furthermore, in the preferred embodiment of the present invention, the nonconductive inner sleeve 26A is a Kynar Dielectric Shield per MIL-I-23053/8, the braided wire sealing sleeve 26B is made out of 38 AWG silver coated cooper wire per ASTM B-298 and the sealing sleeve 26C is VITON tubing per MIL-I-23053/13. VITON is a series of fluoroelastomers.

A pair of end caps 28 are coupled to each end of the shield seal sleeve 26. The end caps 28 are used for environmentally sealing the shielded cable to be spliced together. In the preferred embodiment of the present invention, each end cap 28 has a slight threading to lock each end cap 28 to the shield seal sleeve 26. Furthermore, in the preferred embodiment of the present invention, the end caps are made out of ULTEM.

An adhesive sealant is placed inside each end cap 28. The adhesive sealant is used to hold each end cap 28 to the shield seal sleeve 26 and to environmentally seal the shielded cable 12 which was spliced together. In the preferred embodiment of the present invention, the adhesive sealant is Flourosilicone moisture sealing adhesive.

METHOD OF INSTALLATION

Referring now to FIGS. 1–4, the method of using the splice kit 10 will be described. In order to use the splice kit 10, there must be approximately three (3) inches of free cable on one end of the shielded cable 12 to be spliced together, and two (2) inches on the opposite end of the shielded cable 12 to be spliced together.

Each end 12A and 12B of the shielded cable 12 must be trimmed to expose a wire shielded braid 12C of the shielded cable 12. A portion of the splice kit 10 must be prepositioned on the shielded cable 12 such that a crimp ferrule 14 is coupled to the wire shielded braid 12C of each end 12A and 12B of the shielded cable 12. End caps are also placed on each end 12A and 12B of the shielded cable 12 and positioned on the outside of each crimp ferrule 14 for environmentally sealing the shielded cable 12. A shield seal sleeve 26 is positioned on one end of the shield cable 12 in between one end cap 28 and one crimp ferrule 14 for environmentally sealing the center conductors 12D to be spliced together.

The wire shielded braid 12C of each end 12A and 12B of the shielded cable 12 is then combed out and folded back over each crimp ferrule 14. The insulation on each center conductors 12D to be spliced together is then trimmed back to expose approximately 0.30 inches of the metal center conductor 12D. A crimp sleeve 16 is then placed on each of crimp ferrule 14. The crimp sleeve 16 is crimped to the crimp ferrule 14 using a M22520/5-19 crimp tool. Each crimp sleeve 16 is coupled together by a jumper wire 18. The jumper wire 18 is prewelded to each crimp sleeve so that heat source tools are not required for the installation process. The prewelded jumper wire 18 provides electrical continuity between wire shielded braid 12C on each end of the shielded cable 12. The jumper cable also provides axial strain relief for the center conductors 12D to be spliced together.

A crimp type conductor splice 20 is then used to spliced together the center conductors 12D. Preferably, the conductor splice is a MIL-S-81824 conductor splice. The center conductors are crimped together using #AD-1377 crimp tool.

A dielectric spacer 22 is then used for separating and providing an isolating medium between each center conductor 12D which is spliced together and the jumper cable 18. As can be seen in FIG. 3A, in the preferred embodiment of the present invention, the dielectric spacer 22 has a plurality of slots 22A. The slots 22A are used for separating and holding each center conductor 12D (i.e., the center conductor 12D as well as the conductor splice 20) which is spliced together and the jumper cable 18. Preferably, the dielectric spacer 22 is made out of ULTEM Polyetherimide.

Nonconducting tape 24 is then wrapped around the dielectric spacer 22. The nonconducting tape is used for holding the center conductors 12D and the jumper cables 18 in each slot 22A of the dielectric spacer 22 to ensure separating and providing an isolating medium between each center conductor 12D and the jumper cable 18. In the preferred embodiment of the present invention, the nonconducting tape is KAPTON dielectric barrier tape.

The shield seal sleeve 26 is then slid over the dielectric spacer 22 to cover the conductor splices 20. The shield seal sleeve provides a sealing boot with shielding capabilities for the spliced center conductors 12D.

An adhesive sealant is then placed inside each end cap 28. The adhesive sealant is used for holding each end cap 28 to the shield seal sleeve 26 and for environmentally sealing the spliced shielded cable 12. In the preferred embodiment of the present invention, the adhesive sealant is Flourosilicone moisture sealing adhesive. Each end cap 28, which are slight threaded to lock each end cap 28 to the shield seal sleeve 26, is then placed on each end of the shield seal sleeve 26. A sufficient amount of adhesive sealant must be used such that adhesive sealant will squeeze out of each end of the end cap 28 when the end cap 28 is attached to the shield seal sleeve 26. This will ensure that the spliced shielded cable 12 is environmentally sealed. The excess adhesive sealant may then be wiped away. Alcohol may be used if required to remove the excess adhesive sealant.

The splice kit 10 and method produces an all crimp splice using only hand tools, and produces a splice that is fully compliant with all current aircraft specifications. The splice is thermally rated from −55° C. to 200° C., is resistant to all common aircraft fuels and solvents, and offers full altitude immersion protection.

While the invention has been particularly shown and described with reference to preferred embodiments thereof, it will be understood by those skilled in the art that the foregoing and other changes in form, and details may be made therein without departing from the spirit and scope of the invention.

What is claimed is:

1. An environmentally sealed splice kit for splicing together a shielded cable which is fully immersion protected and which is installed using only hand tool without using heat generating sources comprising, in combination:

a pair of crimp sleeves wherein each crimp sleeve of said pair of crimp sleeves is coupled to a separate wire braided end of said shielded cable;

jumper wire having two ends wherein each end of said jumper wire is coupled to each crimp sleeve of said pair of crimp sleeves for providing electrical continuity between each of said wire braided end of said shielded cable and for providing axial strain relief for said shielded cable to be spliced together;

conductor splices for splicing together center conductors of said shielded cable;

dielectric spacer for separating and providing an isolating medium between said center conductors of said shielded cable to be spliced together and said jumper wire;

shield seal sleeve placed around said center conductors which are spliced together and positioned over said dielectric spacer for providing a sealing boot with shielding capabilities for said shielded cable to be spliced together and said jumper wire;

a pair of end caps coupled to each end of said shield seal sleeve for environmentally sealing said shielded cable to be spliced together; and adhesive sealant placed inside said end caps for holding said pair of end caps to said shield seal sleeve and environmentally sealing said shielded cable to be spliced together.

2. An environmentally sealed splice kit in accordance with claim 1 further comprising a pair of crimp ferrules wherein each crimp ferrule of said pair of crimp ferrules is coupled to said separate wire braided end of said shielded cable to be spliced together for holding and connecting said each crimp sleeve of said pair of crimp sleeves to said separate wire braided end of said shielded cable to be spliced together.

3. An environmentally sealed splice kit in accordance with claim 1 further comprising nonconducting tape wrapped around said dielectric spacer for holding said center conductors of said shielded cable to be spliced together and said jumper wire to said dielectric spacer to ensure separating and providing an isolating medium between said center conductors of said shielded cable and said jumper wire.

4. An environmentally sealed splice kit in accordance with claim 3 wherein said nonconducting tape is dielectric barrier tape.

5. An environmentally sealed splice kit in accordance with claim 1 wherein said each end of said jumper wire is prewelded to said each crimp sleeve of said pair of crimp sleeves.

6. An environmentally sealed splice kit in accordance with claim 1 wherein said jumper wire has at least a quarter inch differential with each of said center conductors of said shielded cable to be spliced together to relieve axial strain from each of said center conductors of said shielded cable to be spliced together.

7. An environmentally sealed splice kit in accordance with claim 1 wherein said dielectric spacer has a plurality of slots for separating and holding said center conductors of said shielded cable and said jumper wire.

8. An environmentally sealed splice kit in accordance with claim 1 wherein said dielectric spacer is made out of Polyetherimide.

9. An environmentally sealed splice kit in accordance with claim 1 wherein said shield seal sleeve comprises:

a nonconductive inner sleeve for providing dielectric protection for said shielded cable to be spliced together;

a braided wire sleeve placed over said nonconductive inner sleeve for providing a shielding effect for said shielded cable to be spliced together;

sealing sleeve positioned over said braided wire sleeve for environmentally sealing said shielded cable to be spliced together.

10. An environmentally sealed splice kit in accordance with claim 9 wherein said sealing sleeve is smaller in length than said braided wire sleeve to expose said braided wire sleeve on each end of said sealing sleeve for providing electrical continuity between each of said wire braided end of said shielded cable to be spliced together.

11. An environmentally sealed splice kit in accordance with claim 9 wherein said nonconductive inner sleeve is a dielectric shield.

12. An environmentally sealed splice kit in accordance with claim 9 wherein said sealing sleeve is made out of fluoroelastomers.

13. An environmentally sealed splice kit in accordance with claim 1 wherein said pair of end caps are made out of Polyetherimide.

14. An environmentally sealed splice kit in accordance with claim 1 wherein said adhesive sealant is Flourosilicone.

15. An environmentally sealed splice kit for splicing together a shielded cable which is fully immersion protected and which is installed using only hand tool without using heat generating sources comprising, in combination:

a pair of crimp sleeves wherein each crimp sleeve of said pair of crimp sleeves is coupled to a separate wire braided end of said shielded cable;

a pair of crimp ferrules wherein each crimp ferrule of said pair of crimp ferrules is coupled to said separate wire braided end of said shielded cable to be spliced together for holding and connecting said each crimp sleeve of said pair of crimp sleeves to said separate wire braided end of said shielded cable to be spliced together;

jumper wire having two ends wherein each end of said jumper wire is prewelded to said each crimp sleeve of said pair of crimp sleeves for providing electrical continuity between each of said separate wire braided end of said shielded cable and for providing axial strain relief for said shielded cable to be spliced together;

conductor splices for splicing together center conductors of said shielded cable to be spliced together;

dielectric spacer for separating and providing an isolating medium between said center conductors of said shielded cable to be spliced together and said jumper wire;

shield seal sleeve placed around said center conductors which are spliced together and positioned over said dielectric spacer for providing a sealing boot with shielding capabilities for said shielded cable to be spliced together and said jumper wire, said shield seal sleeve comprising:

a nonconductive inner sleeve for providing dielectric protection for said shielded cable to be spliced together;

a braided wire sleeve placed over said nonconductive inner sleeve for providing a shielding effect for said shielded cable to be spliced together; and sealing sleeve positioned over said braided wire sleeve for environmentally sealing said shielded cable to be spliced together;

a pair of end caps coupled to each end of said shield seal sleeve for environmentally sealing said shielded cable to be spliced together; and adhesive sealant placed inside said end caps for holding said pair of end caps to said shield seal sleeve and environmentally sealing said shielded cable to be spliced together.

16. An environmentally sealed splice kit in accordance with claim 15 further comprising nonconducting tape wrapped around said dielectric spacer for holding said center conductors of said shielded cable -to be spliced together and said jumper wire to said dielectric spacer to ensure separating and providing an isolating medium between said center conductors of said shielded cable and said jumper wire.

17. An environmentally sealed splice kit in accordance with claim 16 wherein said nonconducting tape is dielectric barrier tape.

18. An environmentally sealed splice kit in accordance with claim 15 wherein said jumper wire has at least a quarter inch differential with each of said center conductors of said shielded cable to be spliced together to relieve axial strain from each of said center conductors of said shielded cable to be spliced together.

19. An environmentally sealed splice kit in accordance with claim 15 wherein said dielectric spacer has a plurality of slots for separating and holding said center conductors of said shielded cable and said jumper wire.

20. An environmentally sealed splice kit in accordance with claim 15 wherein said dielectric spacer is made out of Polyetherimide.

21. An environmentally sealed splice kit in accordance with claim 15 wherein said sealing sleeve is smaller in length than said braided wire sleeve to expose said braided wire sleeve on each end of said sealing sleeve for providing electrical continuity between each of said separate wire braided end of said shielded cable to be spliced together.

22. An environmentally sealed splice kit in accordance with claim 15 wherein said nonconductive inner sleeve is a dielectric shield.

23. An environmentally sealed splice kit in accordance with claim 15 wherein said sealing sleeve is made out of fluoroelastomers.

24. An environmentally sealed splice kit in accordance with claim 15 wherein said pair of end caps are made out of Polyetherimide.

25. An environmentally sealed splice kit in accordance with claim 15 wherein said adhesive sealant is Flourosilicone.

* * * * *